United States Patent [19]
Takahara et al.

[11] Patent Number: 5,760,924
[45] Date of Patent: Jun. 2, 1998

[54] ORIGINAL SCANNING APPARATUS

[75] Inventors: Hiroyuki Takahara, Kawasaki; Takeshi Aoyama, Yokohama; Yoshimitsu Nakane, Chigasaki, all of Japan

[73] Assignee: Canon Kabushiki Kaisha, Tokyo, Japan

[21] Appl. No.: 662,270

[22] Filed: Jun. 12, 1996

Related U.S. Application Data

[63] Continuation of Ser. No. 531,062, Sep. 20, 1995, abandoned, which is a continuation of Ser. No. 82,283, Jun. 24, 1993, abandoned.

[30] Foreign Application Priority Data

| | | | |
|---|---|---|---|
| Jun. 30, 1992 | [JP] | Japan | 4-173262 |
| Dec. 22, 1992 | [JP] | Japan | 4-342502 |
| Dec. 25, 1992 | [JP] | Japan | 4-346723 |
| Jun. 7, 1993 | [JP] | Japan | 5-136061 |

[51] Int. Cl.$^6$ ............................ H04N 1/04
[52] U.S. Cl. ............... 358/474; 358/475; 358/497; 399/211
[58] Field of Search ................. 358/471, 474, 358/475, 494, 497, 509; 359/201; 355/57, 65-66, 233-235, 242; 399/211, 220, 221; H04N 1/04

[56] References Cited

U.S. PATENT DOCUMENTS

| | | | |
|---|---|---|---|
| 4,050,780 | 9/1977 | Wei et al. | 359/201 |
| 4,645,329 | 2/1987 | Iwaki | 355/66 |
| 4,645,335 | 2/1987 | Kwata | 355/57 |
| 5,002,366 | 3/1991 | Okazaki | 355/233 |
| 5,119,136 | 6/1992 | Morikawa | 355/233 |
| 5,287,147 | 2/1994 | Fukasawa et al. | 355/66 |

*Primary Examiner*—Kim Yen Vu
*Attorney, Agent, or Firm*—Robin, Blecker & Daley

[57] ABSTRACT

An original scanning apparatus having a fixed light source which can be applied to image forming apparatus and original reading apparatus. In this apparatus, side reflectors opposed to each other confine light from the light source within a space therebetween in order to efficiently utilize light. A drive assembly for shifting a scanning assembly is arranged to be outside said space between the side reflectors in order to prevent contaminants, oil, or the like of the drive assembly from adhering to reflecting surfaces of the side reflector. Thus nonuniformity in illuminance can be prevented. Also, in order to minimize clearances, which light comes through, between the scanning assembly and the side reflectors, spacers for keeping the clearances constant are provided. Furthermore, in order to prevent nonuniformity in illuminance caused by contaminants, oil, and the like, cleaning members for cleaning the side reflectors are provided.

6 Claims, 13 Drawing Sheets

ORIGINAL SCANNING APPARATUS

This is a continuation application under 37 CFR 1.62 of prior application Ser. No. 08/531,062, filed Sep. 20, 1995, now abandoned which is a continuation of Ser. No. 08/082,283 filed Jun. 24, 1993, now abandoned.

BACKGROUND OF THE INVENTION

1. Field of the Invention

The present invention relates to an original scanning apparatus which is applied to an image forming apparatus such as a copying machine, or an original reading apparatus such as a facsimile apparatus, an image scanner and the like. More specifically, the present invention relates to an apparatus in which exposure scanning is performed with a fixed light source.

2. Related Background Art

In a typical original scanning apparatus such as a copying machine, an original put on an original table is scanned by moving an optical scanning system including a light source, reflecting members, and the like.

Recently, however, since high performance is required for copying machines, faster operation is also required for original scanning apparatus.

Accordingly, in order to lighten weight of the optical scanning system and prevent failure of the light source, there has been devised an apparatus which has a light source fixed in its body and scans the original by moving the optical reflecting members by drive means. In such an apparatus, in order to effectively utilize light from the light source, side reflectors are provided along the moving direction of the optical reflecting members, by both sides of the optical reflecting members.

In this apparatus, however, due to the position of the drive means or that of the reflecting members in relation with the side reflectors, the light from the light source is intercepted or irregularly reflected by the drive means and the light comes through the clearance between the side reflectors and the reflecting members, thereby reducing the amount of light with which the original is illuminated as well as causing nonuniformity in the light amount. Also, contaminants such as dust adhering to the side reflectors may reduce the light amount and cause nonuniformity thereof.

SUMMARY OF THE INVENTION

An object of the present invention is to provide an original scanning apparatus having a fixed light source which can prevent decrease of the amount of light with which the original surface is illuminated and nonuniformity in illuminance.

Another object of the present invention is to provide an apparatus having drive means outside space between the side reflectors opposed to each other.

Still another object of the present invention is to provide an apparatus having side reflectors beside a reflective scanning member and drive means below the optical reflecting member.

Still another object of the present invention is to provide an apparatus having at least part of drive means behind a side reflector.

Still another object of the present invention is to provide an apparatus having spacers for keeping the distance between scanning means and side reflectors.

Still another object of the present invention is to provide an apparatus having cleaning members in scanning means for cleaning side reflectors.

Other objects of the present invention will be clearly understood from the following description.

DESCRIPTION OF THE PREFERRED EMBODIMENTS

Figure 1:
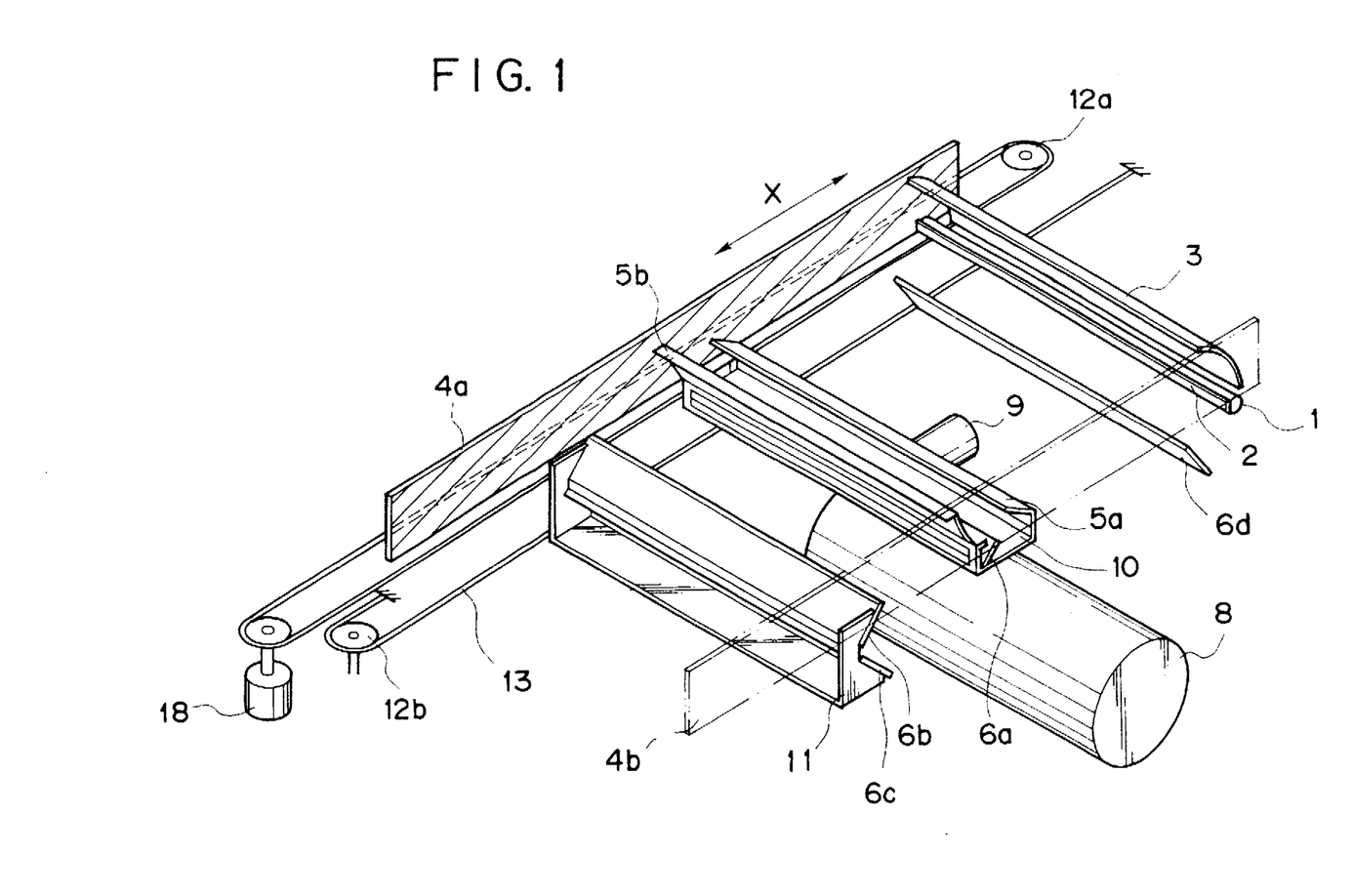
FIG. 1 is a perspective view of an original scanning apparatus of an embodiment according to the present invention.
Figure 2:
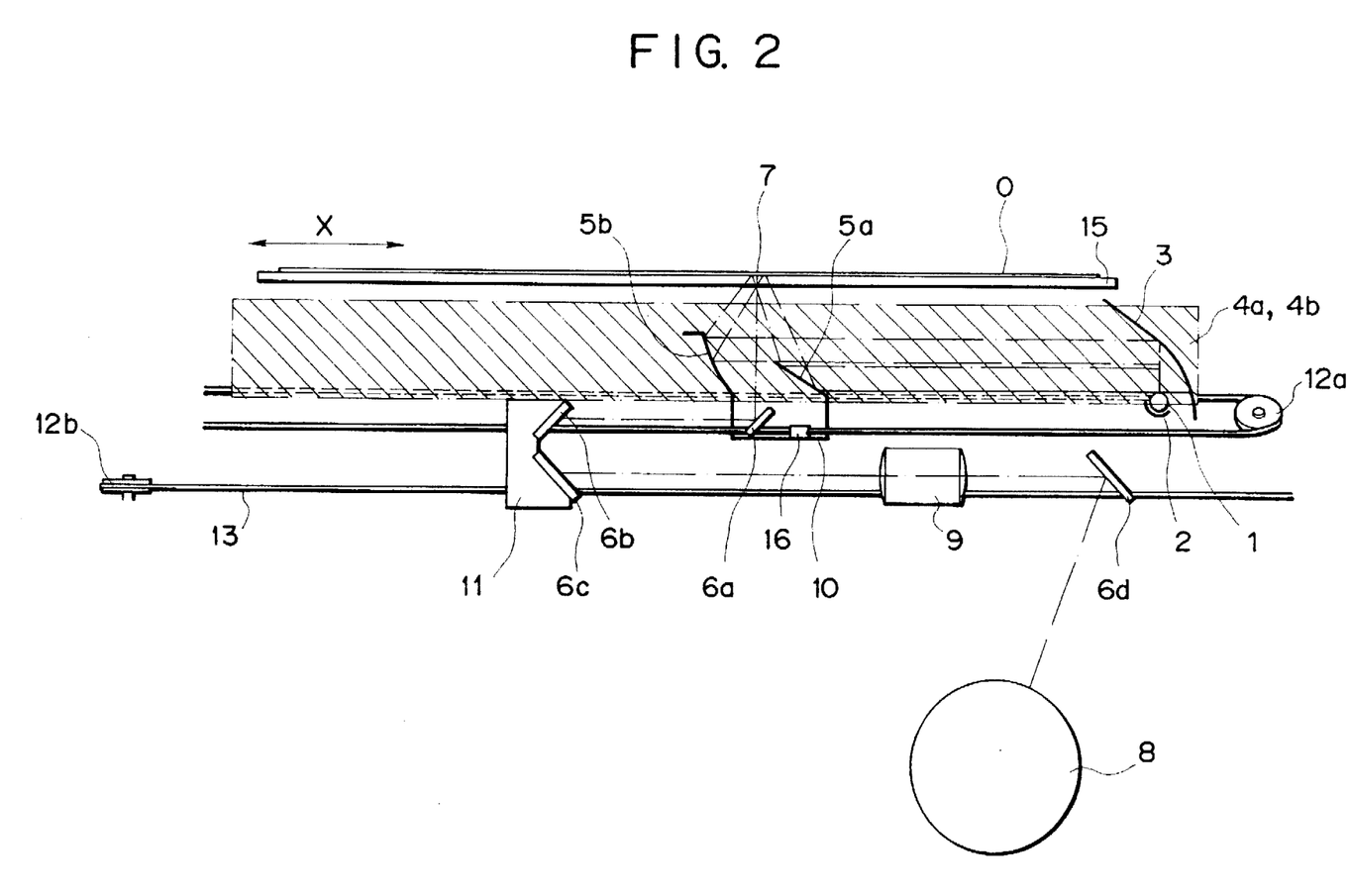
FIG. 2 is a side cross-sectional view of the apparatus shown in FIG. 1.
Figure 3:
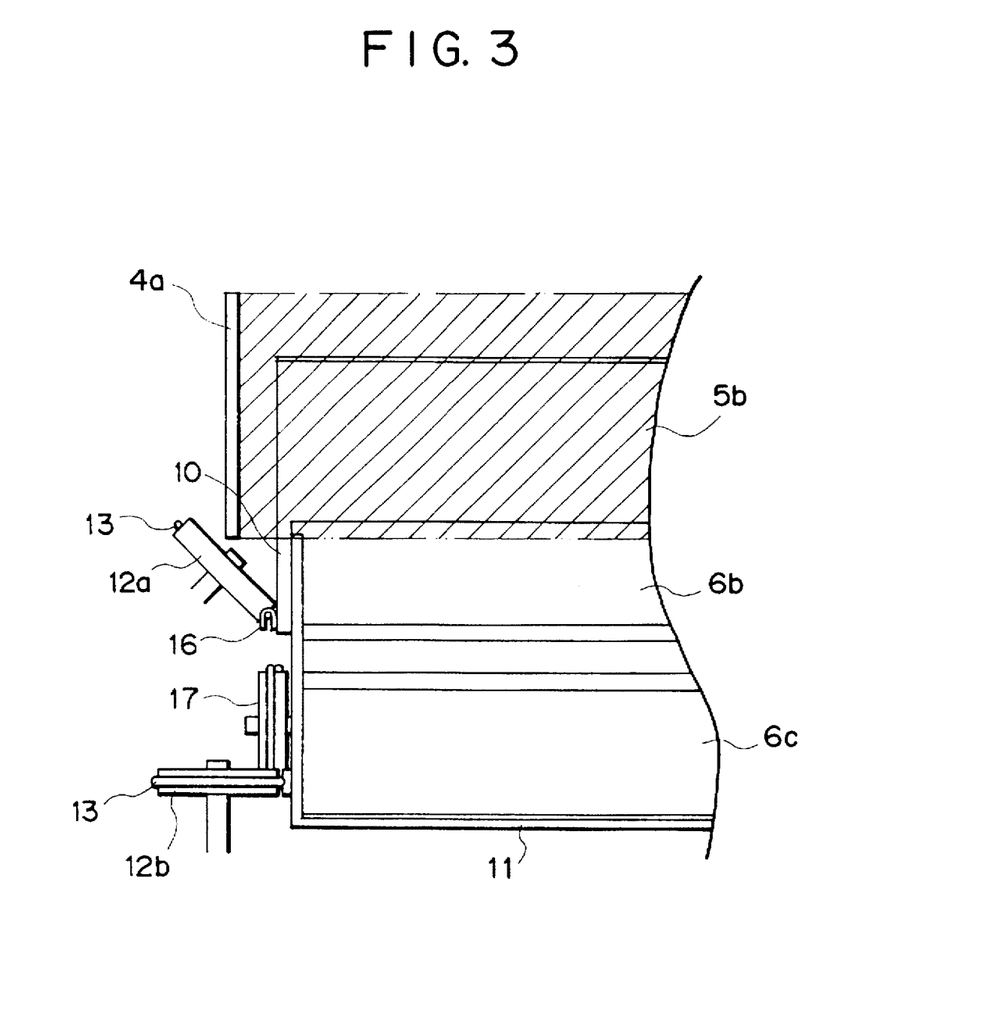
FIG. 3 is a cross-sectional view seen from the scanning direction of the apparatus shown in FIG. 1.
Figure 4:
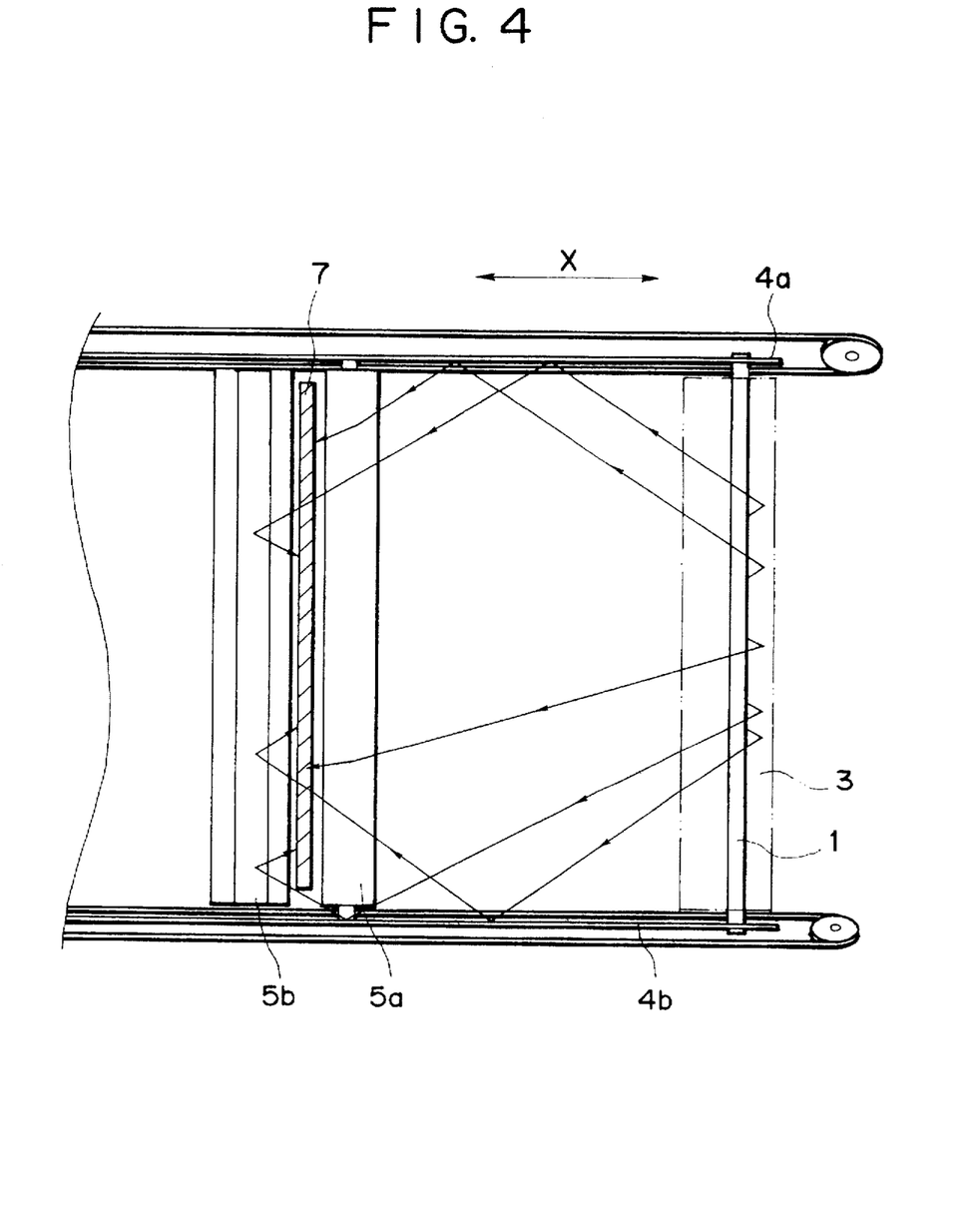
FIG. 4 is a plan view of the apparatus shown in FIG. 1.

Embodiments according to the present invention will be described below in reference to the drawings. FIG. 1 is a perspective view of an original scanning apparatus of an embodiment according to the present invention, FIG. 2 is a side cross-sectional view of the apparatus shown in FIG. 1, FIG. 3 is a cross-sectional view seen from the scanning direction of the main portions of the apparatus shown in FIG. 1, FIG. 4 is a plan view showing the main portions of the apparatus shown in FIG. 1, and FIG. 5 is a schematic cross-sectional view of an image forming apparatus to which this embodiment is applied.

Figure 5:
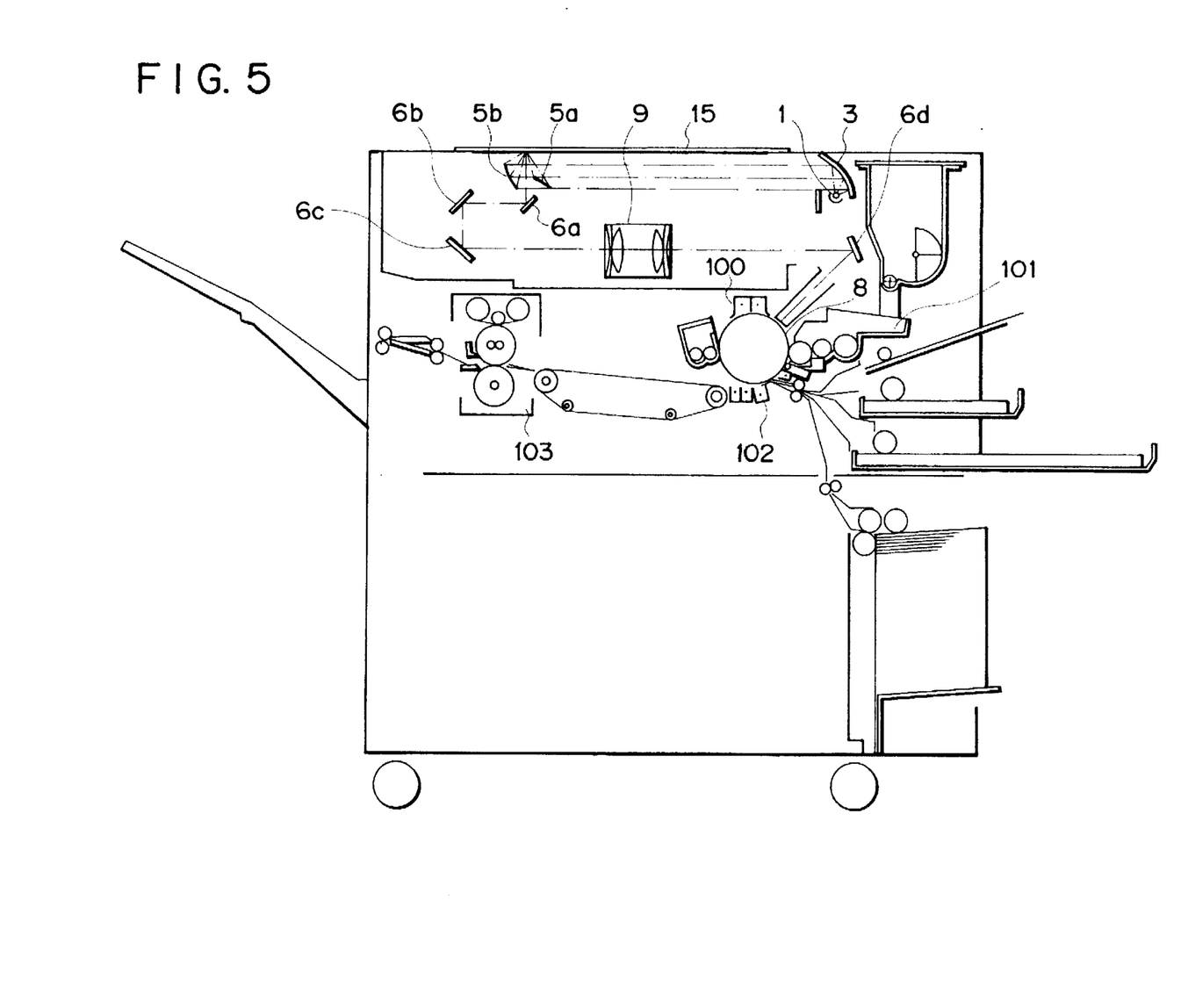
FIG. 5 is a view of an image forming apparatus to which the apparatus shown in FIG. 1 is applied.

First, the apparatus shown in FIG. 5 will be briefly described. Reference numeral 1 denotes a line (bar-like) light source fixed in the apparatus main body, 3 denotes a fixed cylindrical aspherical mirror, 5a and 5b denote movable aspherical mirrors, 6a, 6b and 6c denote movable plane mirrors, 9 denotes a lens, 6d denotes a fixed plane mirror, and 15 denotes an original table on which an original is put. In such a construction, light from the light source is concentrated by the mirror 3 and reflected toward the original table 15 by the mirrors 5a and 5b. Light from the original table reaches a photosensitive drum 8 via the mirrors 6a, 6b and 6c, the lens 9 and the mirror 6d. Since the mirrors 5a, 5b, 6a, 6b and 6c move below the original table 15, the entire original is scanned.

The photosensitive drum 8 charged by a charger device 100 is exposed to the light image obtained from scanning, thereby forming a latent image on the photosensitive drum 8. The latent image is developed with dry toner by a developer device 101, subjected to the processes of a transfer device 102 and a fixing device 103, and formed on a recording sheet as a visible image.

Next, the original scanning apparatus will be described in detail with reference to FIGS. 1 to 4. The line light source 1 such as a halogen lamp is fixed at a stationary portion (not shown) in the apparatus main body. This light source has a shade 2 which intercepts beams emitted from the light source and advancing directly toward the original surface as well as reflects divergent light from the line light source toward the light source again. A fixed cylindrical aspherical mirror 3 fixed to a stationary portion (not shown) which serves as deflecting means for deflecting light has curvature in a plane vertical to the longitudinal direction of the line light source. Side reflectors 4a and 4b fixed to stationary portions (not shown) are provided on both sides of the line light source so as to be substantially vertical to the longitudinal direction of the line light source 1 as well as to be parallel to each other. The side reflectors have mirror surfaces on the sides opposite to each other. Cylindrical, aspherical-shaped reflecting mirrors 5a and 5b are located in the space between the side reflectors 4a and 4b. Each mirror has curvature in a plane vertical to the longitudinal direction of the line light source 1. Mirrors 6a, 6b, 6c and 6d are plate-shaped reflecting mirrors. The side reflectors 4a and 4b are elongated in the scanning direction of the reflecting mirrors 5a and 5b so that both ends of the reflecting mirrors are always between the side reflectors.

Reference numeral 9 denotes the image forming lens, and 8 denotes the photosensitive drum in the image forming apparatus. The cylindrical aspherical mirrors 5a, 5b and a plane mirror 6a are integrally supported by a support frame 10, which constitute first scanning means. Also, the plane mirrors 6b and 6c are integrally supported by a support frame 11, which constitute second scanning means. The support frames 10 and 11 are guided by respective guide mechanisms (not shown) to be movable in the direction indicated by X, wherein the speed of the support frame 10 is twice as large as that of the support frame 11. A wire 13, which is engaged with a pulley 12a and the like, is fixed to the support frame 10 by an engaging member 16. Similarly, the wire 13, while engaged with a pulley 12b and the like, is engaged with a pulley 17 provided in the support frame 11. As shown in FIG. 3, the pulley 12a is positioned substantially under the side reflector, while its axis is arranged in a plane vertical to the direction indicated by X and at an angle of 45° to the longitudinal direction of the line light source. Thus, the pulley 12a and the wire 13 which is engaged with the pulley 12a are arranged to be outside the space between the side reflectors 4a and 4b opposed to each other.

Other parts of the drive means, that is, the pulley 12b, a drive motor 18 for moving the wire 13a, and so on are all arranged to be outside said space between the side reflectors.

As the engaging member 16 is located below the reflecting mirrors 5a and 5b, the wire 13 does not hinder the beam incident on the reflecting mirrors 5a and 5b from the side of the side reflector 4a.

Incidentally, though the drive means consisting of the wires, the pulleys, and so on appears only on one side of the apparatus in FIG. 1 for the sake of clarity, this drive means also has the same parts as those shown in FIG. 1 on the side of the side reflector 4b, as shown in FIG. 4.

Now, operation of the original scanning apparatus of this embodiment will be described. The divergent beam from the line light source provided with the reflecting shade 2 is incident divergently on the cylindrical aspherical mirror 3.

The cylindrical aspherical mirror 3 collimates the beam according to its curvature and emits the beam toward the cylindrical aspherical mirrors 5a and 5b. Behavior of the beam thereafter will be described especially in reference with FIGS. 2 and 4. The light emitted from the cylindrical aspherical mirror 3 has divergence only in the longitudinal direction of the light source. And the beam of said light which is directly incident on the cylindrical aspherical mirrors 5a and 5b is immediately reflected toward the original table 15 and reaches an illumination position 7 of the original 0. On the other hand, the beam of said light which is incident on the side reflector 4a or 4b is reflected thereby and then reaches the illumination position 7 through the cylindrical aspherical mirror 5a or 5b. The beam from the original 0 which is put on the original table 15 in the scanning apparatus of this embodiment forms an image on the photosensitive drum 8 of the image forming apparatus by means of the plane mirrors 6a, 6b, 6c, 6d and the image forming lens 9. In order to scan and read the original, the support frame 10 supporting the cylindrical aspherical mirrors 5a, 5b and the plane mirror 6a is driven in the direction indicated by X in the figure by the pulley 12a, the wire 13a and a DC motor 18, for example, serving as the drive motor. The support frame 11 supporting the plane mirrors 6a and 6c is similarly driven in the same direction by the pulley 12b, the wire 13a and the mirror 18. In this embodiment, as described above, as the beams are confined substantially within the space (indicated by oblique lines in FIG. 3) between the two side reflectors opposed to each other and the drive means for driving the support frames which consists of the pulleys, the wire, and so on is arranged to be outside said space between the side reflectors, the drive means does not hinder the focused beams. Therefore, the original is efficiently illuminated without nonuniformity in the illuminance.

Further, in this embodiment, as the beams are concentrated by the cylindrical aspherical mirror 3, a larger amount of light can be confined within the space between the side reflectors opposed to each other.

Still further, in this embodiment, as the drive means is arranged to be outside the space between the side reflectors, contaminants and oil from the pulleys and the wire can be prevented from adhering to the side reflectors when the apparatus is driven, thereby further reducing deterioration of reflecting efficiency of the side reflectors and nonuniformity in reflection. Therefore, the original is efficiently illuminated without nonuniformity of illuminance.

Furthermore, since the wire is not exposed to the beams from the light source, extension or contraction of the wire caused by heat does not occur. Accordingly, the image forming performance of the image forming optical system in the apparatus is not lowered. Also, deterioration or fatigue caused by heat can be prevented.

Figure 6:
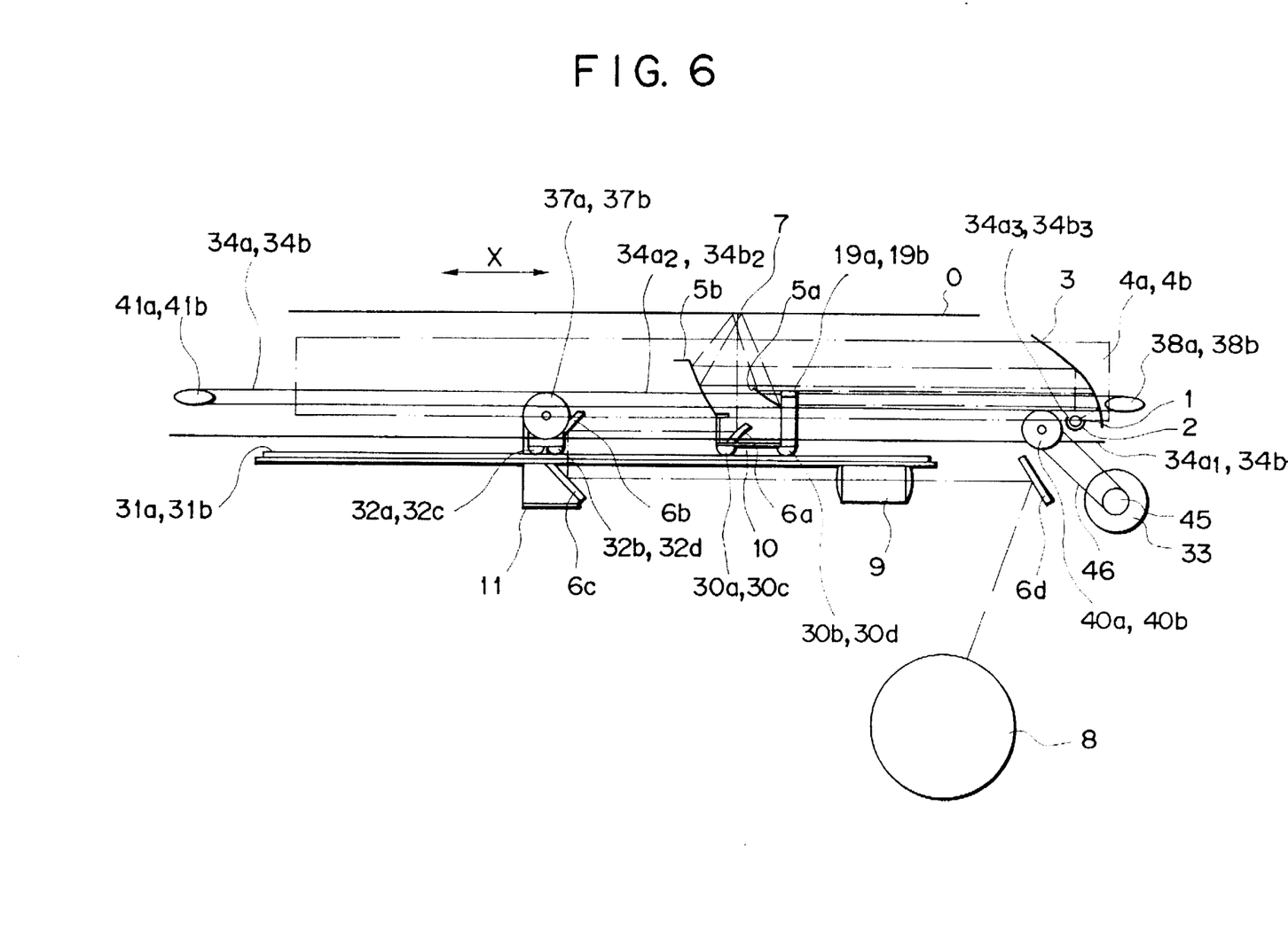
FIG. 6 is a side cross-sectional view of an original scanning apparatus of another embodiment according to the present invention.
Figure 7:
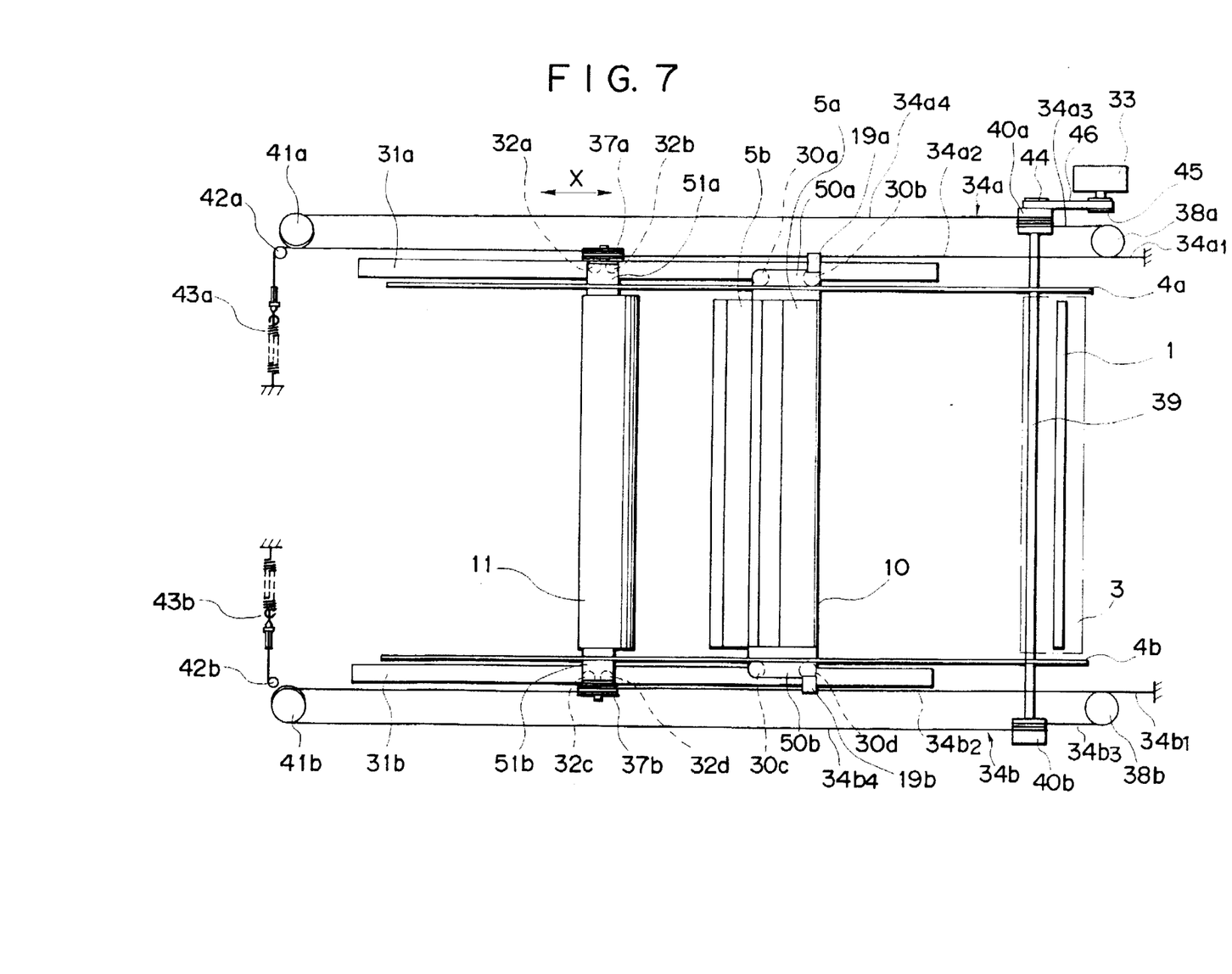
FIG. 7 is a plan view of the apparatus shown in FIG. 6.
Figure 8:
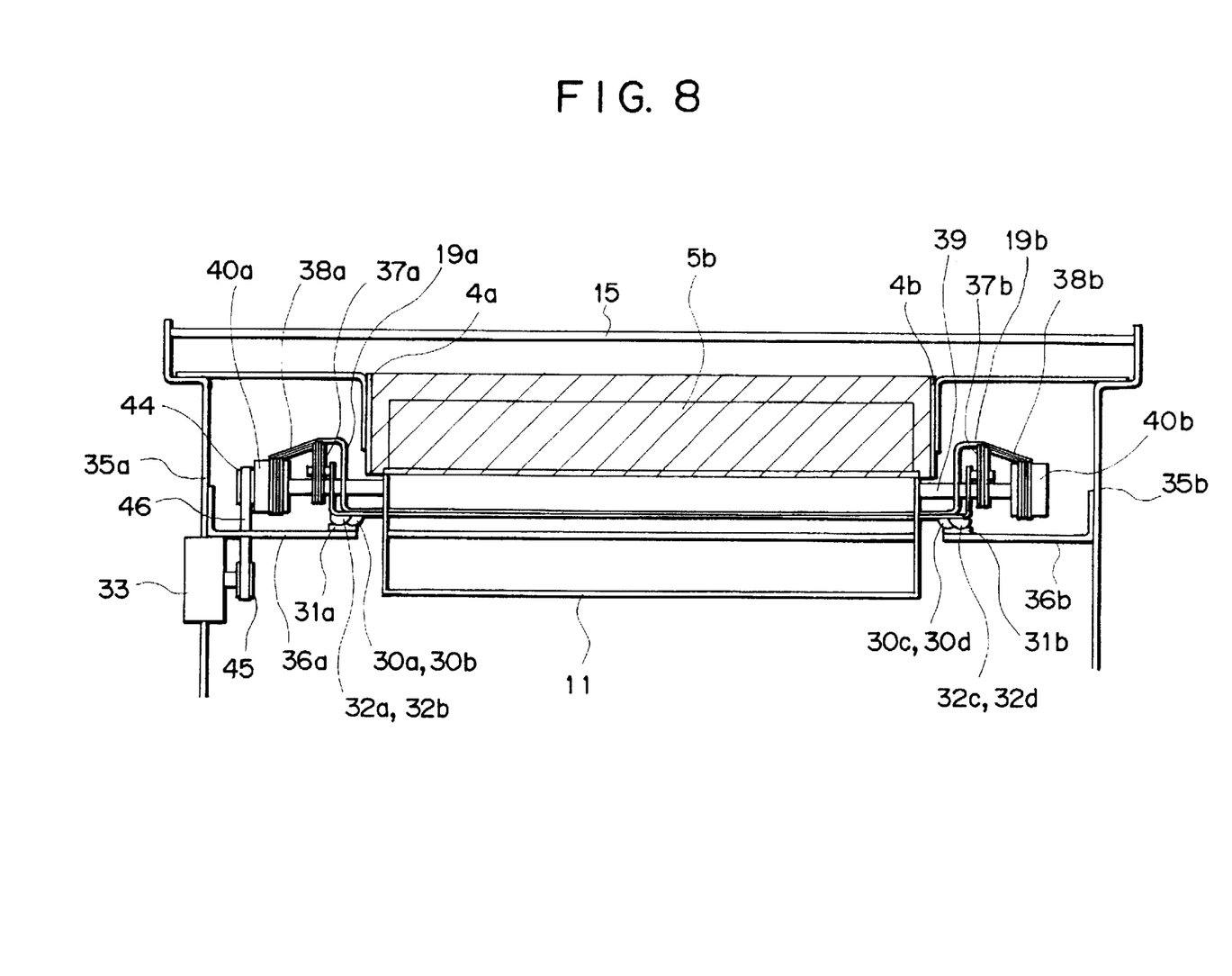
FIG. 8 is a cross-sectional view seen from the scanning direction of the apparatus shown in FIG. 6.

Next, another embodiment of the present invention will be described. FIG. 6 is a side cross-sectional view of the original scanning apparatus of this embodiment, FIG. 7 is a top plan view of the apparatus shown in FIG. 6, and FIG. 8 is a view of the apparatus shown in FIG. 6 seen from the scanning direction. Portions having the same functions as those in the previous embodiment are indicated by the same reference numerals, and different portions will be mainly described. In the figures, the movable cylindrical aspherical mirrors 5a, 5b and the plane mirror 6a are integrally supported by the support frame 10, thereby constituting the first scanning means. On the other hand, the plane mirrors 6b and 6c are integrally supported by the support frame 11, thereby constituting the second scanning means. The support frame 10 has guide support plates 50a and 50b at both ends, wherein said guide support plates are arranged to be lower than the side reflectors 4a and 4b supported respectively by the support members 20a and 20b and protrude from the space between the side reflectors opposed to each other. The guide support plate 50a has guide members 30a and 30b, while the guide support plate 50b has guide members 30c and 30d. Guided by these four guide members, the support frame 10 can be slidden, in the scanning direction (indicated by X in the figures), on two guide rails 31a and 31b, which are respectively provided on support plates 36a and 36b. The support plates 36a and 36b are, in turn, fixed respectively to side plates 35a and 35b in the scanning apparatus. The guide rails 31a and 31b are arranged to be lower than and outside the space between the side reflectors 4a and 4b opposed to each other, and support the guide members 30a, 30b, 30c and 30d to guide the support frame 10. The support frame 11 has guide support plates 51a and 51b at both ends, wherein the guide support plates are arranged to be lower than the side reflectors 4a and 4b and protrude from the space between the side reflectors opposed to each other. The guide support plate 51a has guide members 32a and 32b, while the guide support plate 51b has guide members 32c and 32d. The guide members enable the support frame 11 to slide on the guide rails 31a and 31b in the scanning direction (indicated by X in the figures). These two support frames are driven through two wires 34a and 34b by a motor 33 mounted in the apparatus main body. An end 34a1 of the wire 34 and an end 34b1 of the wire 34b being fixed to the apparatus main body, the wires are engaged respectively with movable pulleys 37a and 37b fixed to the ends of the support frame 11 (portions of the wire 34a and 34b which are drawn out and return from the movable pulleys are indicated by reference numerals 34a2 and 34b2), and further engaged respectively with fixed pulleys 38a and 38b fixed to the apparatus main body. The wires returning from the respective fixed pulleys 38a and 38b (indicated by reference numerals 34a3 and 34b3) are coiled respectively around driving pulleys 40a and 40b fixed to a drive shaft 39 provided in the apparatus main body. The drive shaft 39 is positioned below the side reflectors 4a and 4b, and the driving pulleys are arranged to be outside the space between the side reflectors 4a and 4b. The wires 34a4 and 34b4, which return from the drive pulleys 40a and 40b, are engaged respectively with fixed pulleys 41a and 41b and again with the movable pulleys 37a and 37b. Further, the wires are engaged with fixed pulleys 42a and 42b and are fixed to extension springs 43a and 43b, respectively. The other end of each extension spring 43a, 43b is fixed to the apparatus main body. Fixing arms 19a and 19b engaged with wires and serving as engaging members are provided in the end portions of the support frame 10 in order to fix the support frame to the wires 34a2 and 34b2. A pulley 44 provided in an end of the drive shaft 39 is connected through a belt 46 with a pulley 45 of the motor 33. The drive means which drive the support frames 10 and 11 consists of portions all outside the space between the side reflectors 4a and 4b; including the wires 34a and 34b; the movable pulleys 37a and 37b, the pulleys 38a, 38b, 41a, 41b, 42a, 42b, 44 and 45; the driving pulleys 40a and 40b, the drive shaft 39; the motor 33; the belt 46; the guide rails 31a and 31b; the guide support plates 50a, 50b, 51a and 51b; the guide members 30a, 30b, 30c, 30d, 32a, 32b, 32c and 32d; the fixing arms 19a and 19b; and so on. Note that the wires as parts of the drive means are arranged to be on the opposite sides (that is the rear faces) of the side reflectors with respect to the first scanning means, and to be stretched along the side reflectors.

Next, operation will be described. When the original scanning apparatus starts its operation, the motor rotates at constant speed, whose rotation is transmitted via the belt 46 to the drive shaft 39, thereby rotating the driving pulleys 40a and 40b. The wires 34a and 34b are drawn out by the rotation of the drive pulleys and the support frame 10 having the fixing arms 19a and 19b to which the wire portions 34a2 and 34b2 are fixed is driven by said wires in the scanning direction (indicated by X). At the same time, the support frame 11 having the movable pulleys is driven by the wires 34a and 34b in the same direction as the support frame 10 at ½ of the speed thereof. Thus, the image at the illumination position in the original 0 is scanned and read while the support frames 10 and 11 are shifted, and the light which is read is led through the plane mirrors 6a, 6b, 6c, the lens 9 and the plane mirror 6d to the photosensitive drum 8 to form the image on the photosensitive drum which is rotated synchronously with the motor 33.

As described above, since the drive means is also located outside the space between the side reflectors in this embodiment, the drive means does not hinder light and efficient original scanning can be performed without non-uniformity of illuminance.

Since, in this embodiment, the fixing arms serving as the engaging members for engagement with the wires are provided in the support frame, arrangement of the wires can be done more freely, thereby facilitating the design of the apparatus.

Further, in this embodiment, as the wires are located behind the side reflectors, the wires and the scanning means do not interfere with each other except when necessary for scanning, thereby preventing failure in the apparatus. Incidentally, assembly procedure in this embodiment is carried out as follows: the support plates 36a, 36b and the guide rails 31a and 31b are fixed to the side plates 35a and 35b of the original scanning apparatus; the movable cylindrical aspherical mirrors 5a, 5b, the plane mirror 6a and the guide members 30a, 30b, 30c and 30d are integrally fixed to the support frame 10; and then, the support frame 10, that is the first scanning means, is set on the guide rails 31a and 31b assembled in the apparatus; similarly, the second scanning means is mounted; subsequently, the pulleys 38a, 38b, 41a, 41b, and the wires 34a and 34b are arranged as shown in the figures, thereby completing assembly of the drive means; next, the side reflectors 4a and 4b fixed to the support members 20a and 20b are assembled at the positions shown in the figures; and finally, the original glass table 15 is fixed to the side plates 35a and 35b.

In this embodiment, as described above, since the pulleys 38a, 38b, 41a, 41b and the wires 34a and 34b are arranged at predetermined positions outside the space between the side reflectors 4a and 4b opposed to each other before assembling the side reflectors, said pulleys and wires are prevented from damaging the reflecting surfaces of the side reflectors 4a and 4b. Furthermore, excellent original scanning can be performed without adhesion of contaminants, oil, and the like to the reflecting surface of the side reflectors.

Now, another embodiment according to the present invention capable of effectively utilize the light from the light source will be described. This embodiment is basically the same as the above-mentioned embodiments, and portions different from those in the above embodiments are mainly described.

Figure 9:
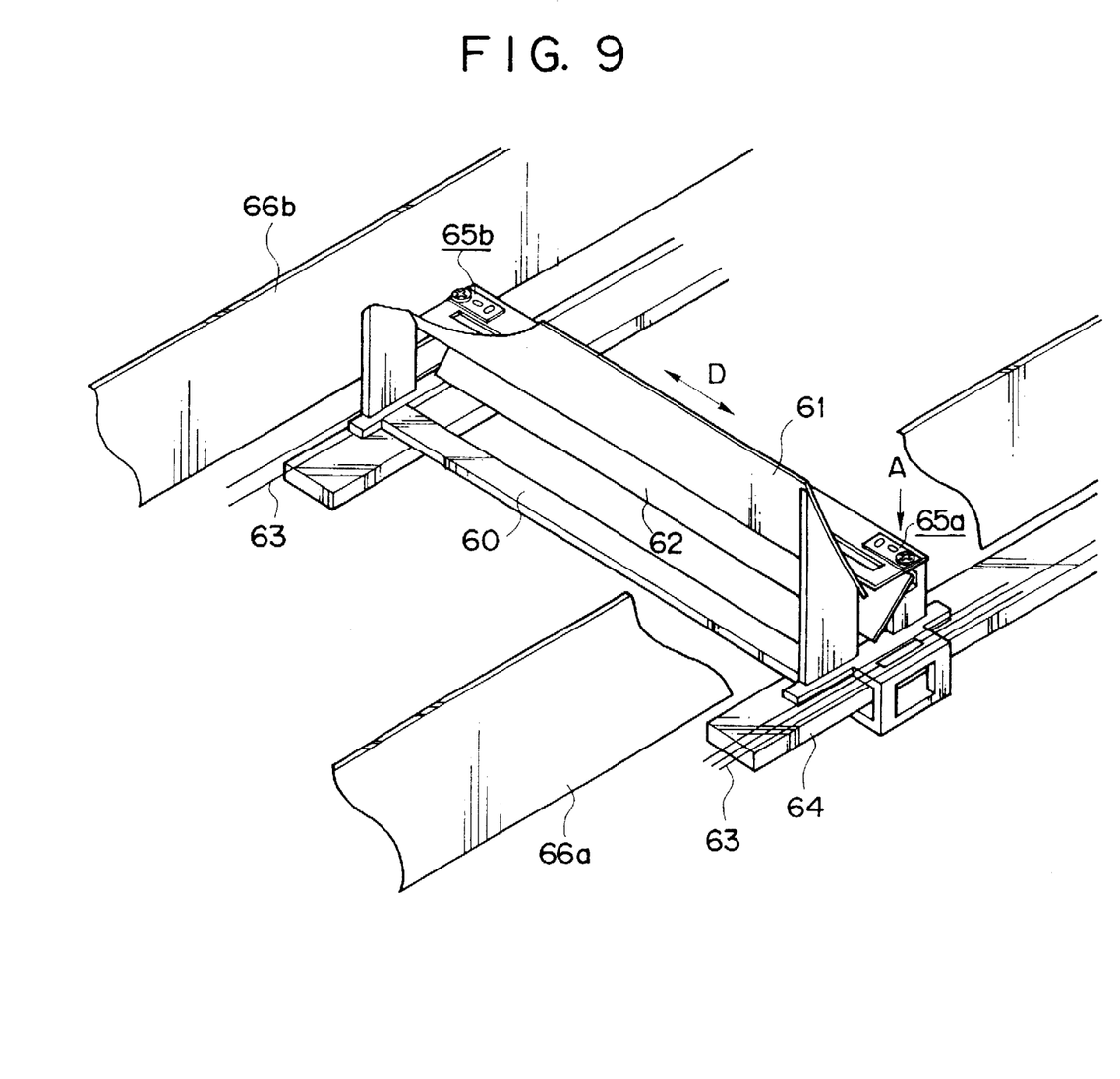
FIG. 9 is a perspective view of an original scanning apparatus of still another embodiment according to the present invention.
Figure 10:
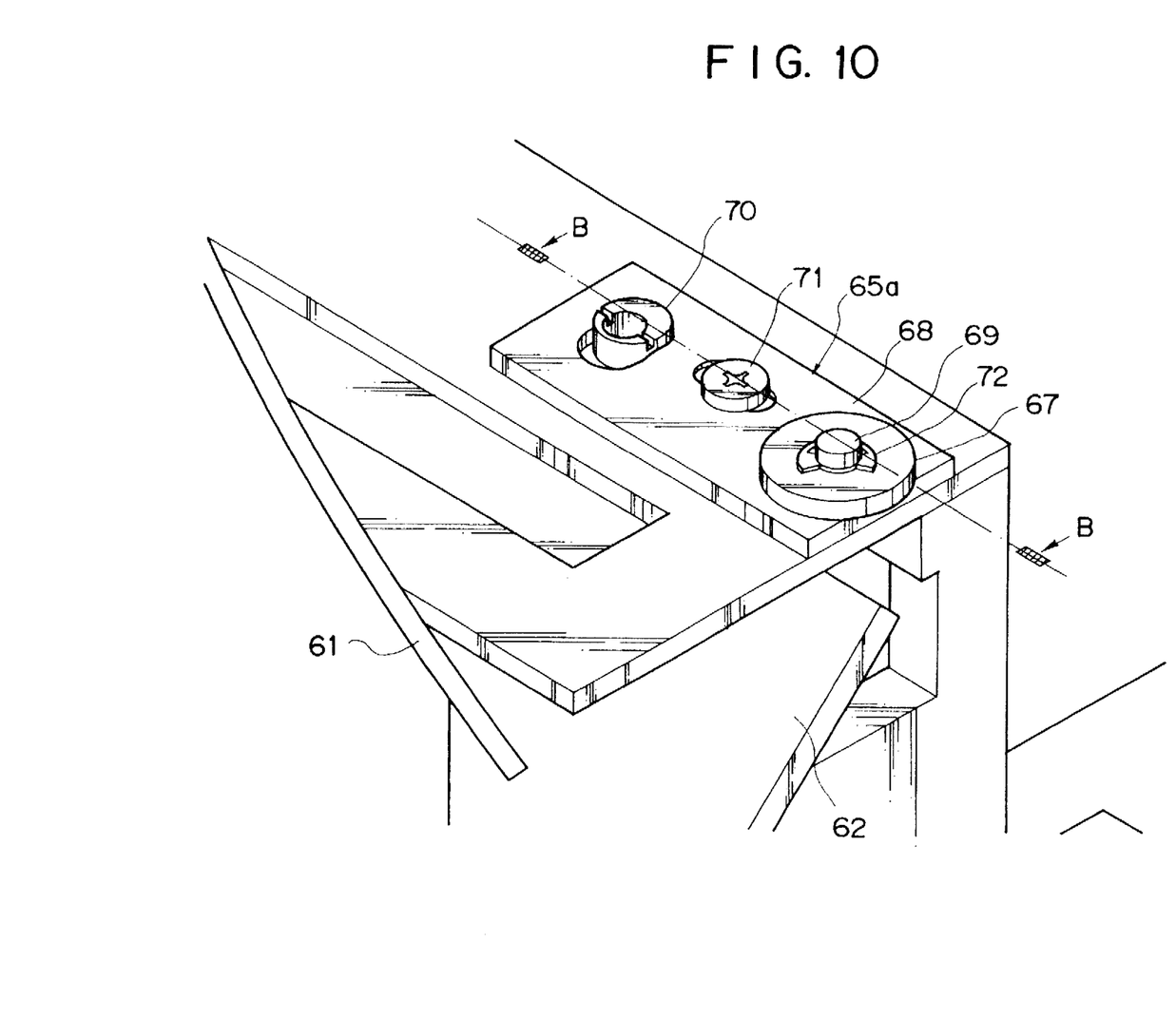
FIG. 10 is an enlarged view of a main portion A in the apparatus shown in FIG. 9.

FIG. 9 is a perspective view of the original scanning apparatus of this embodiment. FIG. 10 is an enlarged view of the main portion A shown in FIG. 9, and FIGS. 11A and 11B are cross-sectional views along B—B in FIG. 10.

In FIG. 9, a mirror base 60 supporting a cylindrical aspherical mirror 61 and a first mirror 62 is moved by the drive means in the image scanning direction. Wires 63 fixedly supported by both ends of the mirror base 60 transmit driving force from the drive motor (not shown) to the mirror base. These wires are positioned below the mirror 61 so as to intervene between the mirror 61 and the side reflectors 66a and 66b. Contact means 65a and 65b guarantee clearances between the cylindrical mirror 61 and respective side reflectors 66a and 66b. There contact means will be described with reference to FIG. 10. A contact roller 67 has a surface made of smoothly sliding material and is rotatably provided. An adjusting plate 68 supports the contact roller 67 and adjusts the position thereof. A pin 69 is caulked to the adjusting plate 68. An eccentric cam 70 shifts the position of the adjusting plate 69. A set screw 71 fixes the position of the adjusting plate 68. An E-ring 72 restricts the position of the contact roller 67 in the thrust direction.

Figure 11A:
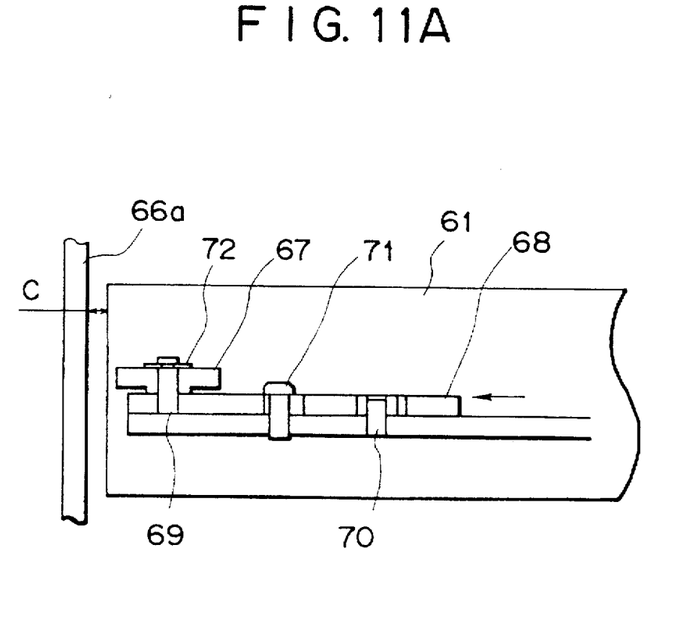
FIGS. 11A and 11B are cross-sectional views along B—B of the apparatus shown in FIG. 10.
Figure 11B:
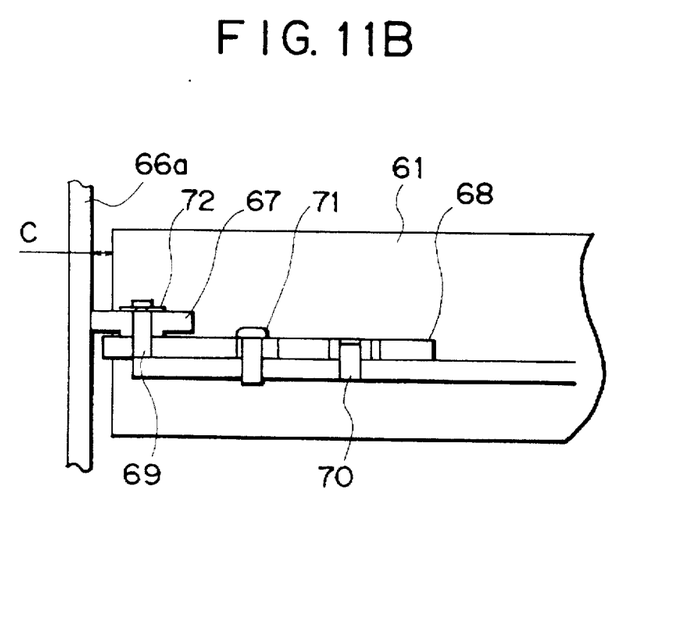

In order to adjust the position of the contact roller 67, as shown in FIGS. 11A and 11B, the eccentric cam 70 is turned so that clearances C between the scanning mirror 61 and respective side reflectors 66a and 66b become uniform at both longitudinal ends of the scanning mirror 61. Then, the contact roller 67 is pressed to come into collision with the side reflector 66a, where the contact roller 67 is fixed by means of the set screw 71 (FIG. 11A). The other end is also adjusted in the same way (FIG. 11B). During scanning and exposure, the contact roller 67 thus adjusted rotate while colliding with the side reflectors 66a and 66b, thereby keep the clearances C between the scanning mirror 61 and the side reflectors 66a and 66b constant and uniform at both longitudinal ends of the scanning mirror 61. Accordingly, in this embodiment, it is possible to maximize the longitudinal dimension of the scanning mirror 61, that is, minimize the clearances C between the scanning mirror 61 and the respective side reflectors 66a and 66b, thereby effectively prevent light from coming through the clearances between the scanning mirror and the side reflectors to utilize light from the light source efficiently.

Next a variation of the above-mentioned embodiment will be described with reference to FIG. 12.

Figure 12:
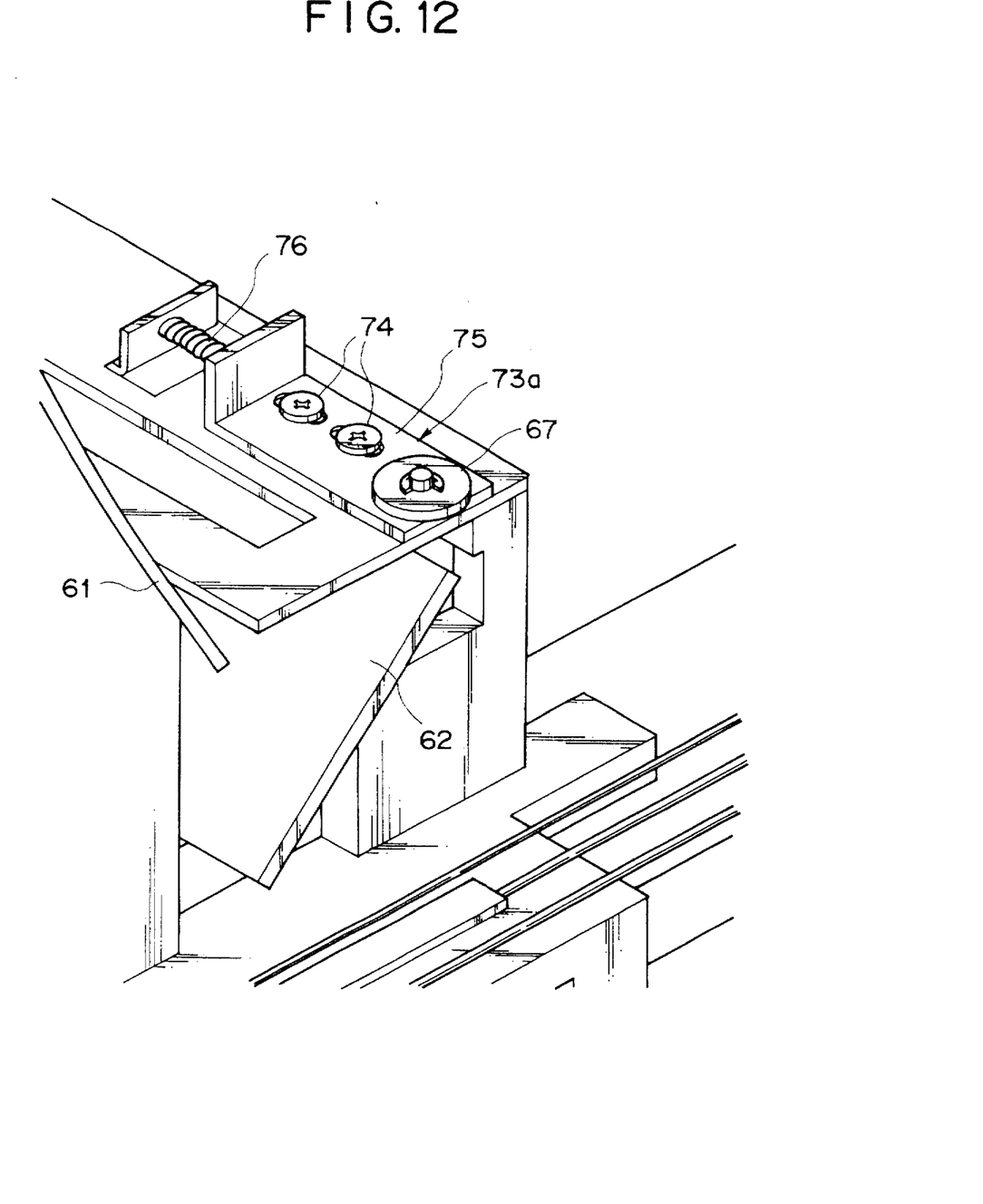
FIG. 12 is a view showing a variation of the apparatus shown in FIG. 9.

FIG. 12 is a perspective view of an apparatus, a variation of the above-mentioned embodiment which adjusts the rollers rotatably provided between the mirror base and the side reflectors to the side reflectors in a different way.

In FIG. 12, contact means 73a and 74b (74b is not shown) are provided in both longitudinal ends of the mirror base so as to be movable in the longitudinal direction of the mirror base. A shoulder bolt 75 is provided in order to fix the adjusting plate 75 for adjusting the contact means to the mirror base, or to allow the mirror base to shift in the longitudinal direction. A compression coil spring 76 presses the adjusting plate 75 toward the side reflector 66a. Compression coil springs make the clearances between the mirror base and the side reflectors on both sides uniform. During scanning and exposure, the contact rollers rotate while always collided with the side reflectors 66a and 66b. Accordingly the mirror base can shift in the longitudinal direction so as to keep the clearances from the side reflectors 66a and 66b uniform even the mirror base is swayed in the longitudinal direction. Therefore, also in this embodiment, it is possible to maximize the longitudinal dimension of the scanning mirror 61, that is, minimize the clearances between the scanning mirror 61 and the side reflectors 66a and 66b, thereby preventing light from coming through and effectively utilizing light from the light source. Furthermore, as the rollers are movable and are pressed to be always in contact with the side reflectors during scanning, tolerance of dimensional precision such as straightness in the longitudinal direction is large.

Figure 13A:
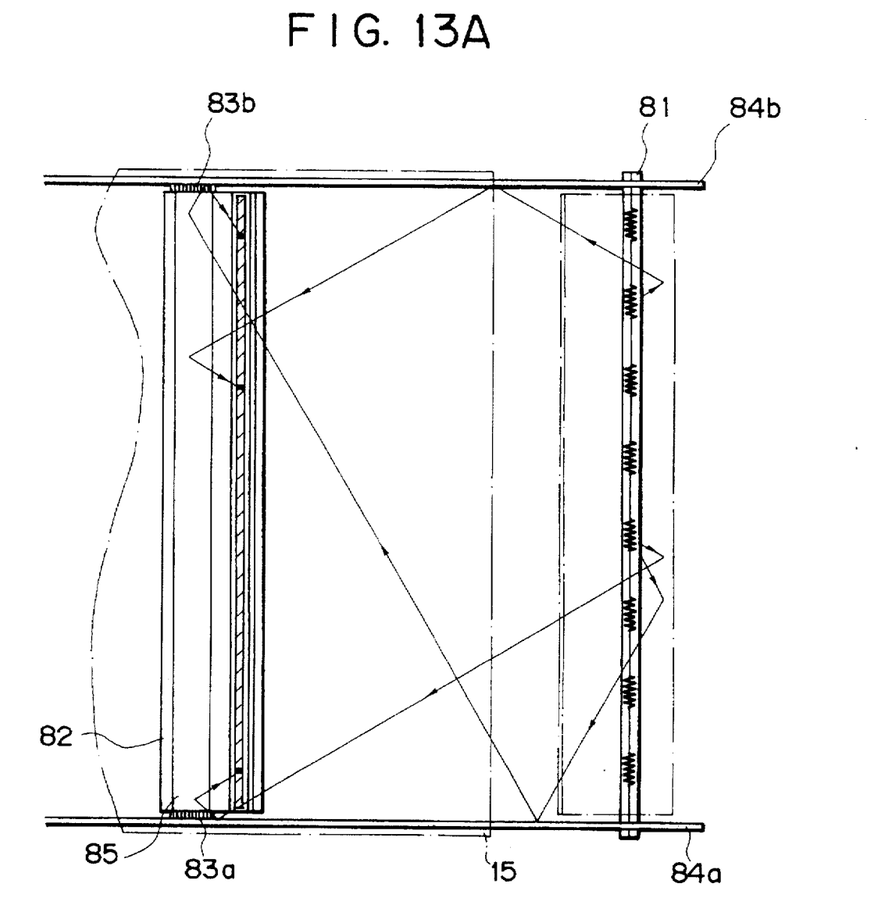
FIGS. 13A and 13B are views showing an original scanning apparatus of still another embodiment according to the present invention.
Figure 13B:
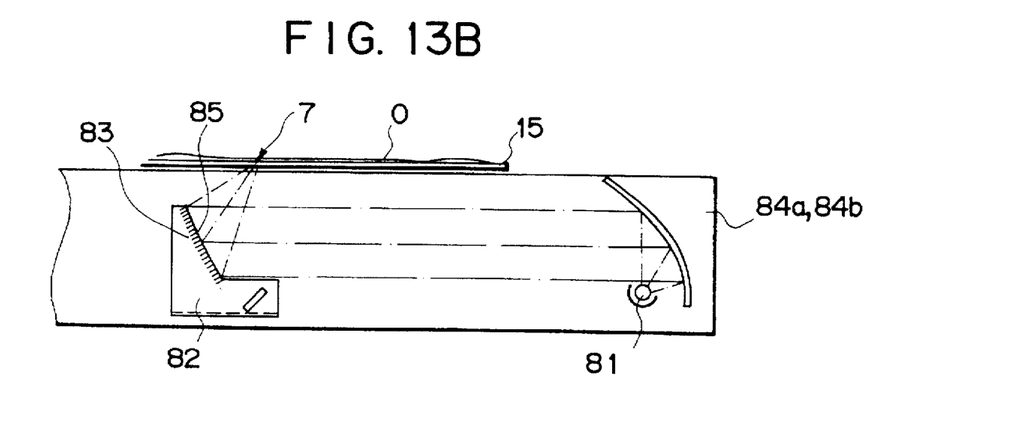

Next, another embodiment according to the present invention capable of uniformly illuminating the original will be described with reference to FIGS. 13A and 13B. FIG. 13A is a plan view of the original scanning apparatus of this embodiment, and FIG. 13B is a side view thereof. When the reflecting surface of the side reflector in an original scanning apparatus is stained with dust, oil, and so on with age, proper luminous distribution can not be realized in the illuminated area. Therefore, in this embodiment as shown in FIGS. 13A and 13B brushes 83a and 83b serving as cleaning members are bonded to both ends of the first mirror base 82 of the first scanning means so that the brushes touch respective side reflectors 84a and 84b. Thus, every time the first mirror base 82 shifts to scan the original, the brushes 83a and 83b are also shifted in contact with the side reflectors 84a and 84b, thereby automatically cleaning the reflecting surfaces of the side reflectors 84a and 84b.

Therefore, in this embodiment, light from the light source 81 can be uniformly reflected toward the original illumination position 7 by the side reflectors. Incidentally, of course, similar effect can be obtained when the brushes 83a and 83b are provided with the scanning mirror 85 of the first scanning means so that the brushes come into contact with the side reflectors 84a and 84b. Note that it is highly effective to apply the arrangements of the drive means shown respectively in FIG. 1 and FIG. 6 to the above embodiments shown in FIGS. 9, 12, 13A and 13B.

Though, in the above-mentioned embodiments, a halogen lamp is used as the line light source, a line (bar-like) fluorescent light source or an array of point light sources may be used. The drive means of the embodiments is not limited to those using pulleys, wires, belts, and the like, but includes those using gears, feed screws as well as those using linear motors for direct drive.

Furthermore, though the above-mentioned embodiments are applied to the image forming apparatus, they may be applied to an original reading apparatus in which light image from an original is read by a photoelectric transfer element such as a CCD.

The present invention described above is not limited to the above-mentioned embodiments, but comprises all the variations possible in the range of technical ideas of the present invention.

What is claimed is:

1. An original scanning apparatus comprising:

an original table on which an original is laid;

a fixed light source;

a reflecting member for reflecting light from said light source toward said original table;

a carriage for holding said reflecting member, said carriage moving in a direction going away from said light source and in a direction coming near said light source;

a drive source for moving said carriage;

a wire for transmitting power of said drive source to said carriage; and side reflectors which are opposed to both end portions of said reflecting member over an area where said carriage moves, wherein said carriage is coupled to said wire at a position under said side reflectors in a vertical direction and within a range between said side reflectors in a longitudinal direction of said reflecting member.

2. An apparatus according to claim 1, further comprising a first mirror for changing direction of the reflected light from the original laid on said original table, and second and third mirrors for returning back 180° the light from said first mirror, said first mirror being held by said carriage.

3. An apparatus according to claim 2, further comprising a second carriage for holding said second and third mirrors, said second carriage moving at a half velocity of said carriage.

4. An apparatus according to claim 2, wherein said first, second and third mirrors are arranged below the area surrounded by said side reflectors.

5. An apparatus according to claim 1, wherein said apparatus introduces the reflected light from the original laid on said original table into a photosensitive member.

6. An apparatus according to claim 1, wherein said apparatus introduces the reflected light from the original laid on said original table into a photo-electric transfer element.

* * * * *